D. H. SEYMOUR.
ROOT WASHER.
APPLICATION FILED MAY 23, 1913.

1,198,779.

Patented Sept. 19, 1916.
2 SHEETS—SHEET 1.

Witnesses
W. C. Fielding
Harry M. Fist

Inventor
D. H. Seymour,
By
Chandler & Chandler
Attorneys

D. H. SEYMOUR.
ROOT WASHER.
APPLICATION FILED MAY 23, 1913.

1,198,779.

Patented Sept. 19, 1916.
2 SHEETS—SHEET 2.

Witnesses
W. C. Fielding
Harry M. Test

Inventor
D. H. Seymour,
By
Chandler & Chandler
Attorneys

UNITED STATES PATENT OFFICE.

DAVIS HOWARD SEYMOUR, OF PETERSBURG, VIRGINIA.

ROOT-WASHER.

1,198,779.   Specification of Letters Patent.   Patented Sept. 19, 1916.

Application filed May 23, 1913. Serial No. 769,468.

*To all whom it may concern:*

Be it known that I, DAVIS H. SEYMOUR, a citizen of the United States, residing at Petersburg, in the county of Dinwiddie, State of Virginia, have invented certain new and useful Improvements in Root-Washers; and I do hereby declare the following to be a full, clear, and exact description of the invention, such as will enable others skilled in the art to which it appertains to make and use the same.

This invention relates to improvements in root washers, and particularly to washers for beets, turnips, carrots, and the like.

The principal object of the invention is to provide a simple device of this character which will efficiently wash the roots and automatically deliver the same from the washing cylinder.

Other objects and advantages will be apparent from the following description when taken in connection with the accompanying drawings, in which—

Figure 1:
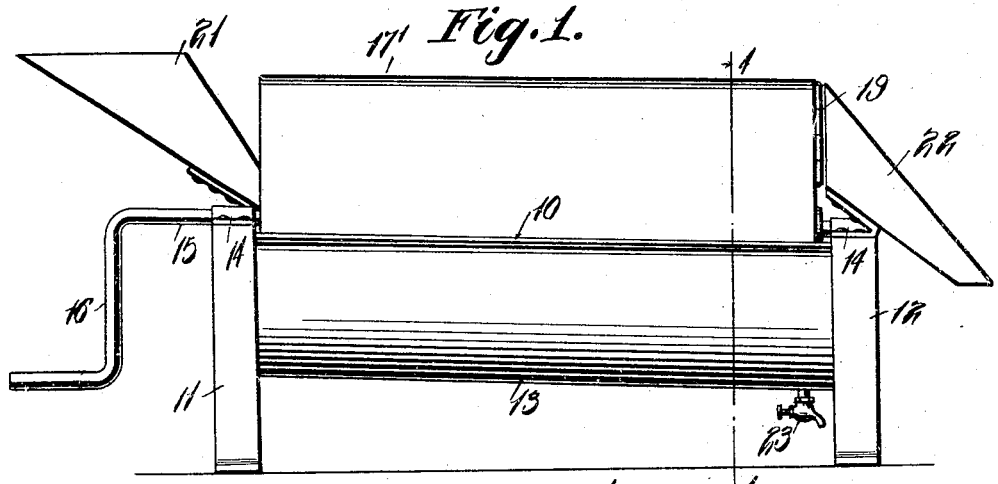
Figure 2:
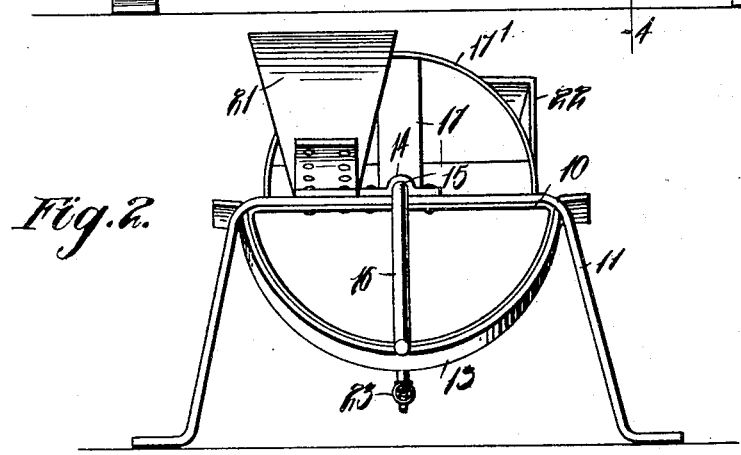
Figure 3:
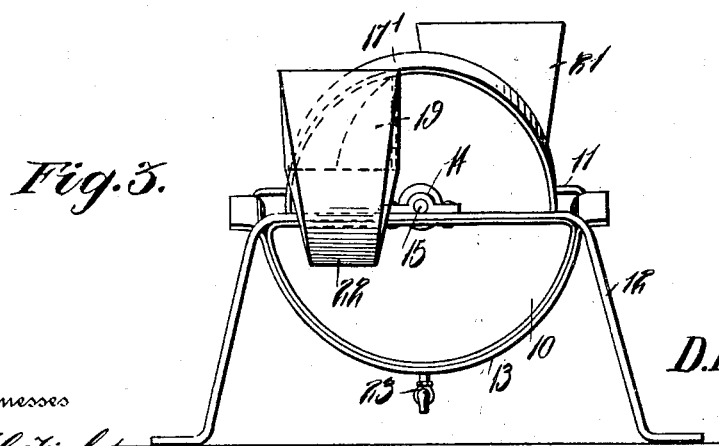
Figure 4:
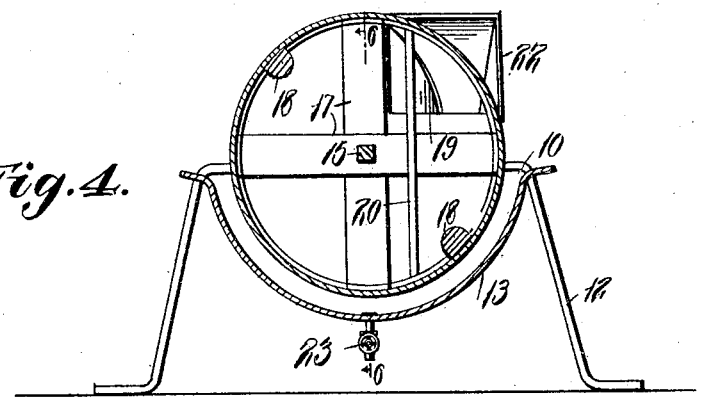
Figure 5:
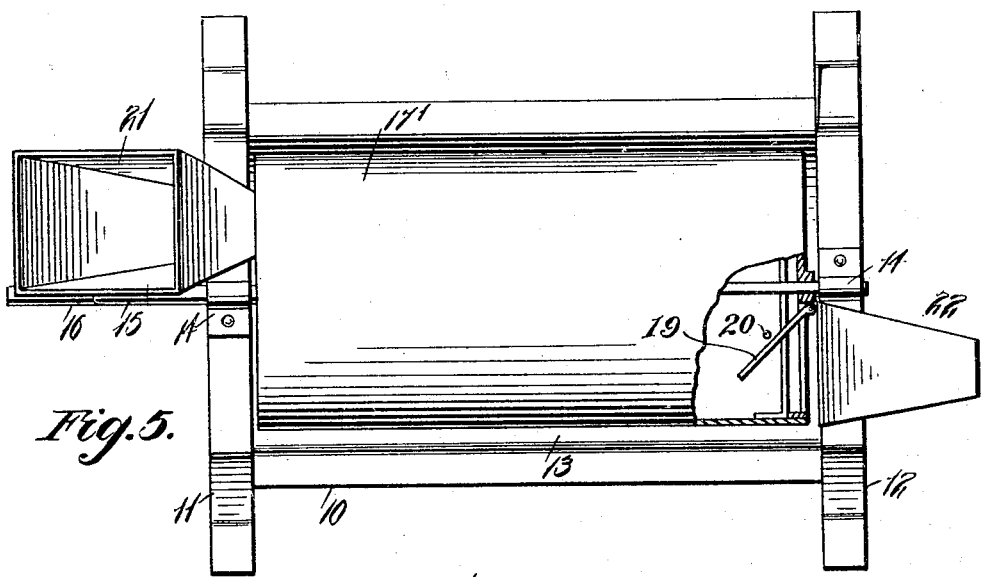
Figure 6:
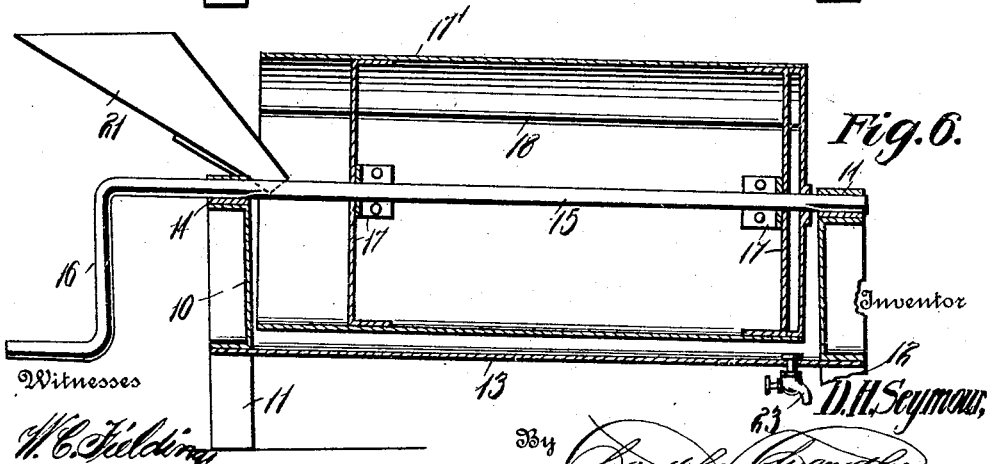

Figure 1 is a side elevation of a device of this character made in accordance with my invention, Fig. 2 is an end view taken from the receiving end, Fig. 3 is a view taken from the opposite end, Fig. 4 is a vertical transverse sectional view, on the line 4—4 of Fig. 1, Fig. 5 is a plan view, and Fig. 6 is a vertical longitudinal sectional view on the line 6—6 of Fig. 4.

Referring particularly to the accompanying drawings, 10 represents a frame suitably supported by the front and rear legs 11 and 12, the former of which are slightly longer than the latter so that the frame is elevated at one end. Secured to this frame is an elongated trough 13. Suitably journaled in bearings 14 at the ends of the frame is a longitudinally extending shaft 15, one end being provided with a crank handle 16. Extending radially from the shaft are the arms 17, to the outer ends of which are secured the drum or cylinder 17' through which the said shaft passes, and with which it rotates.

Secured to the inner face of the drum and extending longitudinally thereof are a plurality of slats 18. In the end wall at the lower end of the cylinder or drum is an inwardly opening hinged door 19, a suitable stop 20 being arranged within the drum to limit the inward movement thereof, so that the door when opened inwardly stands at an acute angle, with respect to the end of the cylinder. It will be observed that this door is so hinged to the end wall that it is arranged to close by gravity when the drum is rotated to bring the door in its lowered position. By reason of this the water is prevented from all running out of the drum. Furthermore, the door can open freely when in raised position so that it acts as a deflector plate to guide the roots through the opening normally closed by the door.

At the entrance end of the cylinder is arranged a suitable chute 21 on which are adapted to be dumped the beets or turnips which are to be cleaned. At the discharge end is arranged a suitable chute 22 through which the cleaned roots pass into a suitable receptacle. The tank is provided with a drain cock 23.

From the foregoing it will thus be seen that roots can be thoroughly cleaned and discharged without any handling of them whatever, the device being automatic, so that the roots eject themselves from the drum by engagement with the inclined door. The tank or trough is first partly filled with water, the water flowing into the open end of the cylinder. The door 19 is held in closed position during the washing operation by any suitable means. The roots to be washed are then fed to the cylinder by means of the chute 21, and the cylinder rotated. The roots are thrown about in the cylinder and thereby washed, gradually working their way to the lower end of the cylinder. After the roots are thoroughly washed, the door is set in open position by any desired means, as by wedging a root or block of wood between the door and ends of the cylinder. When the roots strike the door 19, they are deflected out into the chute 22, from which they are delivered to any suitable receptacle.

What is claimed is:

In a root washer, a rotating inclined drum having a closure at its lower end provided with a door opening and a door hinged at one edge of the opening and opening inwardly, said door being arranged to close by gravity when in lowered position whereby to prevent escape of water from the drum and to open freely when in raised position, and means to limit the opening movement of the door arranged to cause the door to set diagonally across the drum when opened whereby the opened door constitutes a deflector plate to guide the roots through the opening.

In testimony whereof, I affix my signature, in the presence of two witnesses.

DAVIS HOWARD SEYMOUR.

Witnesses:
A. K. POWELL,
C. McD. POPE.

Copies of this patent may be obtained for five cents each, by addressing the "Commissioner of Patents, Washington, D. C."